July 23, 1968   J. R. REEDER   3,393,502
TWISTING PROCESS AND APPARATUS
Filed Oct. 20, 1965   2 Sheets-Sheet 1
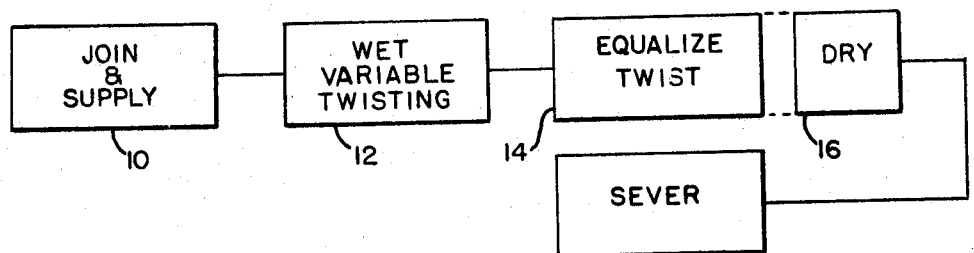
FIG. 1
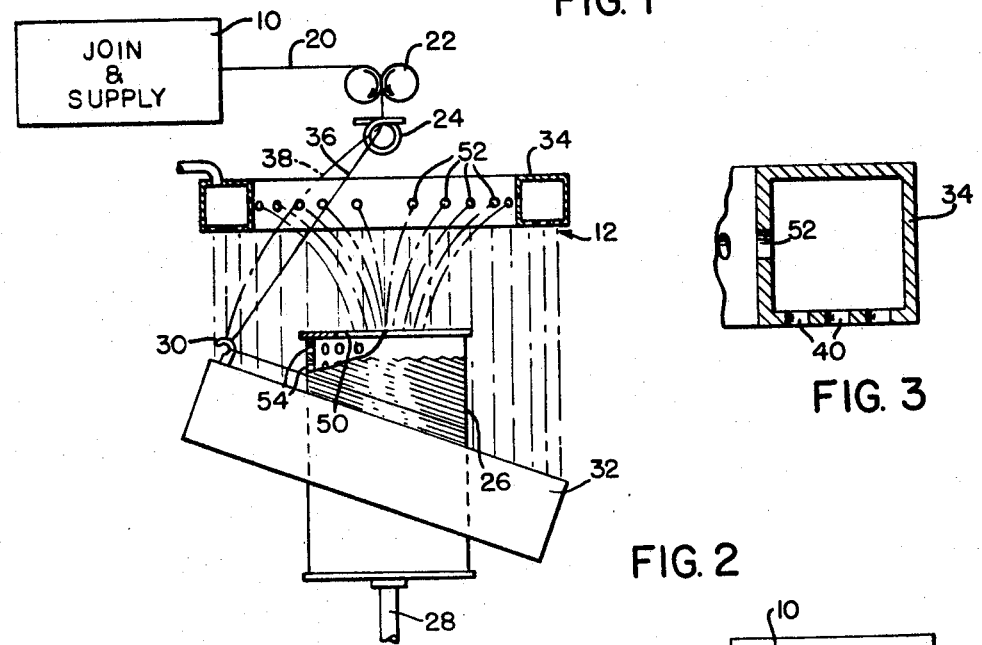
FIG. 2
FIG. 3
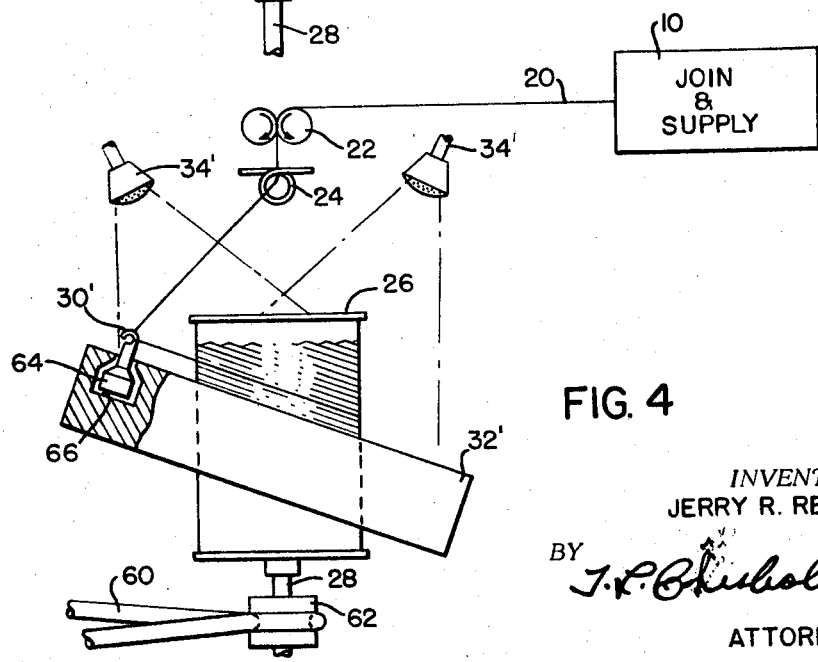
FIG. 4
INVENTOR.
JERRY R. REEDER
BY
*J. P. Chisholm*
ATTORNEY July 23, 1968  J. R. REEDER  3,393,502

TWISTING PROCESS AND APPARATUS

Filed Oct. 20, 1965  2 Sheets-Sheet 2

INVENTOR.
JERRY R. REEDER

BY J. P. Chisholm

ATTORNEY

United States Patent Office 3,393,502
Patented July 23, 1968

3,393,502
TWISTING PROCESS AND APPARATUS
Jerry R. Reeder, Lockport, Ill., assignor to Ethicon Inc., a corporation of New Jersey
Filed Oct. 20, 1965, Ser. No. 498,388
13 Claims. (Cl. 57—72)

ABSTRACT OF THE DISCLOSURE

Continuous round strings are made from short ribbons of animal gut by joining the ribbons end-to-end, spinning one or more of the joined strips into a continuous string and equalizing over a unit of length unequal distribution of twists in the string by supporting the string under tension between two supports which are farther apart than a unit of length in which the uneven twist occurs. The twisting is done by a ring traveling about an orbit which is inclined with respect to the axis of the spool upon which the string is wound. While being spun the gut is sprayed with water to preserve the moisture content of the gut. The ring on the inclined track is revolved either positively, as by a rotating magnetic field, or by the tension of the string being twisted against any suitable brake.

---

This invention relates to the making of continuous strings from animal gut and particularly to forming the gut into unlimited continuous lengths, and preparing and treating such continuous lengths.

The invention is particularly useful in making strings for surgical sutures, and it will be described, for illustration only, with such use in mind. However the invention is not limited to this use.

Heretofore in the manufacture of sutures from animal gut it has been customary to process the gut in the available relatively short lengths of the starting material, for example thirty feet. This has many well known disadvantages which result not only from the short lengths but also from the variation of physical and chemical characteristics from one specimen of gut to another.

It has long been desired to make continuous strings of animal intestines in which an average or composite of qualities is established, not only through the length of suture, but from one suture to another. Methods of doing this and apparatus for doing it have been proposed, for example, those disclosed in the U.S. patents to Selby 2,391,483, 2,438,132 and 2,441,601. However none of the proposed methods or apparatus of others which have come to my attention can satisfactorily produce a continuous string of animal gut which can be formed into acceptable surgical sutures.

In seeking to overcome the disadvantages of known processes, in the joint U.S. Patent 3,247,600 issued to me with Raymond W. Bergman, the disclosure of which is incorporated herein by reference. It is proposed to join short pieces of animal gut end-to-end and continuously spin or twist the joined ribbons into a round string.

In that patent we propose to spray the spinning apparatus continuously with liquid, whether water or a chemical reagent, to keep the gut wet or to give it permanent physical and/or chemical properties while the gut is being spun. The process disclosed in that patent has proved very successful but it has certain inherent limitations. We have discovered that it does not maintain the gut as wet as is desirable for satisfactory processing and uniform chemical treatment in spite of spraying the spinning apparatus continuously with liquid. I believe that factors contributing to insufficient or irregular wetting are the short inital exposure of the gut to the liquid due to the very short distance from the flyer (in which the gut is shielded from the water) to the spool, the tension of the gut being wound onto the spinning package which tends to squeeze liquid out of the gut, the centrifugal force of the spinning package which tends to throw liquid out of the gut, and the speed of spinning of the package tends to prevent the sprayed liquid ever from reaching the gut beyond the outermost surface of the package. It is also probable that the flyer, at the speed of the spinning, tends to throw important amounts of liquid away from the gut before it can reach the gut from the spray device.

Another disadvantage of previously proposed methods and apparatus of twisting gut ribbons into round strings is that variations in size, thickness or physical properties vary from one strip of starting material to the next and this makes it difficult to twist uniformly a string consisting of two or more plies or strands of ribbon to make a multiply string.

It is an object of the invention to reduce or remove these disadvantages of previous processes and devices and to secure more adequate, uniform and reliable wetting and/or chemical treatment of the gut during its entire process up to the formation of a round twisted string ready for drying.

It is also an object of the invention to improve and simplify the spinning apparatus and the method of spinning to provide a simpler, more reliable and more economical method of forming the twisted spring and laying it onto a package.

It is also an object of the invention to provide an improved process and apparatus by which irregularities in the twisting process can be equalized and distributed uniformly throughout the entire length of the string.

Another object of the invention is to provide an improved process and apparatus by which the effects of irregular twisting can be reduced or eliminated or averaged or distributed uniformly over a length of string.

These and other objects of the invention will be evident from the following description and from the accompanying drawings, in which FIG. 1 is a process diagram showing the succession of steps in carrying out one form of my invention.

FIG. 2 is a diagrammatic illustration of the principles of apparatus embodying the invention.

FIG. 3 is an enlarged section corresponding to the section of the spray head indicated in FIG. 2.

FIG. 4 is a similar illustration of one form of apparatus embodying the invention.

Figure 5:
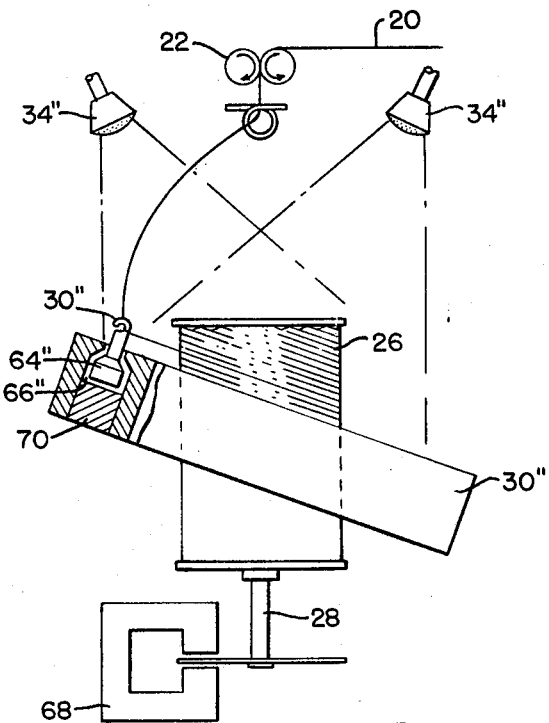
FIG. 5 is a similar diagrammatic illustration of another form of the invention.
Figure 6:
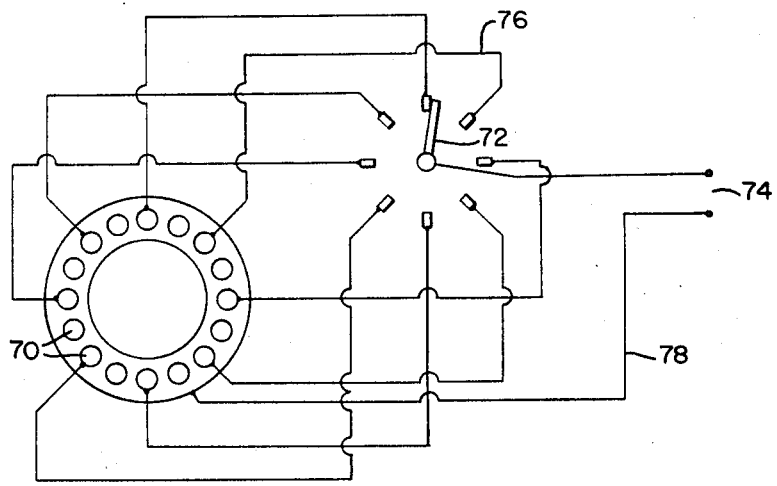
FIG. 6 illustrates schematically one form of control circuit for producing a rotating magnetic field for the apparatus shown in FIG. 5.

Referring to FIG. 1, I first join end-to-end in any suitable manner (for example as disclosed in Patent 3,247,-660 referred to) enough strips of animal gut to form a continuous joined ribbon of suitable indefinite length, for example a mile. This may be done by hand in a joining and supply tank 10, or previously joined strips may be wound on one or more spools and floated in a tank for the spinning apparatus as disclosed in Patent 3,247,660. The supply tank 10 may be filled with water or with any desired chemical reagent to give the gut the desired permanent physical and chemical properties.

Then while the gut strip is wet it is spun into a round string by the wet variable twisting device 12, after which the package of spun string is removed from the spinning or twisting device and passed through a twist equalizing step 14, then dried in a drying step 16 and finally severed into appropriate lengths for sutures as indicated by the rectangle 18 marked sever. The dotted lines connecting the rectangles 14 and 16 indicate that the twist equalizing step or the twist equalizing apparatus may be combined with the drying step or the drying apparatus, and that alternatively these steps and these two pieces of apparatus may be separated.

From the join and supply tank 10 joined continuous ribbon 20, either as a single ribbon for a one-ply string or as a number of parallel ribbons for a multi-ply string is led between feed rolls 22 and a guide 24 to the wet variable twisting apparatus generally designated by 12. The feed rolls are urged toward each other and are rotated by any suitable means, not shown, as is known in the textile spinning art.

The twisting apparatus includes an upright spool 26 mounted on a spindle 28 below the guide 24 so that the spool may be rotated inside the path of a twisting element 30 which latter travels around the spool 26 in an orbit which is inclined to the axis of the spool. Preferably the twisting element 30 slides in a slot in a track 32 which is inclined to the axis of the spool 26 as indicated in FIG. 2.

The twisting member 30 can be a traveling ring similar in principle to the rings of known ring spinning textile devices as indicated in FIG. 4 or it may be a positively driven flyer similar in principle to the driven flyers of known flyer spinning textile devices, as illustrated in FIG. 5.

In either case rotation of the spinning element 30 combined with the linear feed of the ribbons to be twisted by the feed rolls 22 and combined with the winding onto a package on the spool 26 pulls the strand, in a cone 36 or balloon 38, and twists the strand, either a single or multiple ribbon 20, into a round string and lays it on the spool 26 in the form of an annular package of spun string.

In order to keep the gut ribbon wet enough for proper spinning the entire spinning apparatus may be continuously sprayed with water or desired chemical reagent from a spray head 32 surrounding the string being twisted, and disposed above the spool.

The spray head may be formed as shown in Patent 3,247,660 referred to, and any suitable number may be disposed above and around the cone or balloon formed by the string being spun. This results in a spraying device the principle and action of which is equivalent to that of the diagram in FIG. 2, which is explanatory of principle.

FIG. 2 shows a ring which may be formed as shown in FIG. 3. It is of sufficient diameter and is placed sufficiently high to clear the cone 36 or balloon 38 formed by the revolving string being twisted. The spray head is continuously supplied with water or any suitable liquid reagent and, through openings 40 distributed around its bottom, sprays a curtain of liquid around the cone or balloon and onto the revolving twisting element 30. This tends to reduce or eliminate the ballooning familiar in textile ring spinning, which ballooning, if excessive, is undesirable in spinning wet gut.

The spool used for forming the package is preferably of the form shown in Patent 3,247,660. This has an open or perforate end, diagrammatically represented in FIG. 2 by the hole 50 in the end flange. This hole catches liquid from the spray, and to be certain that enough liquid enters the inside of the spool, the ring has side jet holes 52 which discharge jets into the open end of the spool. The wall of the spool is suitably perforated or is porous as represented schematically by openings 54 so that liquid in the spool will be continuously forced under pressure to the package of gut being wound, due to the centrifugal action of the rapidly rotating spool. This may turn at about 3500 r.p.m., for example. The liquid seeps through the gut and keeps it adequately wetted.

This form of spinning device is particularly suited to this improved wetting, for there is no mechanical part which might form an obstruction to flow or to movement of the string between the guide 24 and the twisting element 30.

In actual structure, the spray head 34 may be a number of uniformly perforated disks instead of a ring, and may be placed above the guide 24 to discharge liquid over the whole area included by the path of the element 30, and into the open end of the spool, as indicated diagrammatically in FIGS. 4 and 5.

If the invention as outlined in FIG. 2 is embodied in a ring spinning device the spindle 28 and spool 26 will be positively driven by any suitable device diagrammatically represented by the driving belt 60 and whorl 62. The feed rolls 22 are also positively driven by any known device, not shown, synchronously with the spindle 28 and in the required ratio of speed as is customary in the textile spinning art. In this case the spinning element or twisting element 30' corresponds to the well known ring and is supported in and guided around the track 32' by a head or shoulder 64 in a slot 66. This twists the string in a well known manner and subjects the string to ballooning as indicated by the curved line of the strand between the ring 28' and the guide 24.

Such ballooning in the spinning operation is frequently a disadvantage especially with delicate single-ply gut. The placing of the spray head 34 so as to surround the balloon with a downwardly flowing curtain of liquid diminishes the ballooning and keeps it within practical limits.

As the twisting element 30' moves around the ring or track 32' in the inclined orbit provided by this track, the ring or spinning element cyclically traverses a length of the spool and so winds the gut in a cop-like package distributed over this length of the spool. This eliminates the requirement of any traversing apparatus for the spool itself.

In the form of apparatus shown in FIG. 5 the track 30'' is made of non-magnetic material, the support or shoulder 64'' on the spinning element 30'' is formed of magnetic material, and means is provided for generating a rotating magnetic field which positively drives the magnetic shoulder 64'' around the track at the desired speed. This makes a flyer of the twisting element 30'' but with the novel advantage that there is no structure or material between the open end of the spool and the guide 24. This has the advantage that flyer type of spinning may be done while the interior of the package is being supplied with liquid.

As is customary with spinning apparatus having positively driven flyers, the spindle and spool are not driven but are freely rotatable except for the retarding influence of any suitable drag brake 68 which may be of the eddy current type as is known.

The rotating field may be provided by any suitable known apparatus such as distributed windings supplied with an alternating current as in the electric motor art. Alternatively the rotating magnetic field may be supplied by a series of electro magnets 70 placed in the bottom of the slot 66 and energized successively by a rotating switch arm 72 which successively supplies current from a source 74 through wires 76 to one side of each magnet in turn, the other side of each magnet being grounded to the track 32'' and connected to the other side of the source by a return line 78.

My invention contemplates equalizing twist in unevenly twisted strings, by which I mean distributing uniformly along the length of a string irregularities in twisting such as variations in the number of twists per unit of length. This is done in the equalizing step 14 indicated in FIG. 1.

For example spinning by the apparatus of either FIG. 4 or FIG. 5 results in unequal number of twists per unit length of the string, because the spinning ring or flyer, whichever is used, is constantly changing its distance from the feed rolls 22 and consequently applies a given number of twists to continuously changing length of string in revolving at uniform speed.

I may overcome irregularities in the twisted string by supporting freely under tension and drying between two spaced supports a length of string materially longer than the maximum length of string between the rolls 22 and the twisting device 30. This supported length is preferably a multiple of the unit lengths of string to which the twist is applied. For example the maximum unit length of string to which the twist is applied by the twisting device 30 may be of the order of two feet. A greater length such as four feet or six feet may be supported between the points. This may be done either intermittently and progressively or continuously by the two forms of drying apparatus disclosed in Patent 3,247,660.

The string may be wound on flat racks as disclosed in that patent which may be for example, six feet long and the racks may be hung in a drying atmosphere. The string is preferably wound on the racks under tension so that there may be three unit lengths of variably twisted string which when supported under tension will distribute automatically the twists uniformly along the supported length. The string dries into a uniformly twisted string.

Preferably the equalizing and drying step are combined as a continuous step by feeding the irregularly twisted string to the continuous drying mechanism disclosed in Patent 3,247,660. There the string is fed continuously over a plurality of series of rollers in a plurality of drying ovens of progressively changing temperature and humidity. The rollers can be constructed and arranged so that a length of string many times the maximum unit length of variably twisted string is supported freely and under tension between two rollers. The rollers are either positively driven or are rotated by pulling the string continuously through the ovens, so that while the length of unsupported string remains constant a different portion of the continuous string is supported between the rolls from moment to moment. As the string progressively dries this distributes the twists uniformly along the length of the entire string.

In the intermittent drying process after the string has dried it is cut into lengths between the points of support, each length being suitable for one or more sutures. Such sutures are substantially identically twisted and are uniform in twist from end-to-end.

In the continuous drying process the continuous string is cut up into suitable lengths between the joints of the original individual ribbons. This provides substantially identical sutures which are uniformly twisted along each suture.

I claim as my invention.

1. In a method of making sutures from short pieces of animal gut, the improvement which includes successively joining end-to-end a series of flat ribbons of animal gut, progressively and continuously twisting the joined continuous ribbon into a string having varying numbers of twists in a unit of length while moving the gut in the direction of its length and while the gut is wet, supporting free between separated points a second unit of length of the string longer than the first unit of length to distribute the twists substantially uniformly along the second unit of length, drying the string to bond it permanently into a substantially uniformly twisted string, and severing said second length from the string adjacent the points of support to form a suture.

2. In a method of making sutures from short pieces of animal gut, the improvement which includes successively joining end-to-end a series of flat ribbons of animal gut, progressively and continuously twisting the joined continuous ribbon into a string having varying numbers of twists in a unit of length while moving the gut in the direction of its length and while the gut is wet, supporting free between separated points a second unit of length of the string which is a multiple of the first mentioned unit of length to distribute the twists substantially uniformly along the second unit of length, drying the string to bond it permanently into a substantially uniformly twisted string, and severing said second length from the string adjacent the points of support to form a suture.

3. In a method of making sutures from short pieces of animal gut, the improvement which includes successively joining end-to-end a series of flat ribbons of animal gut, progressively and continuously twisting the joined continuous ribbon into a string having varying numbers of twists in a unit of length while moving the gut in the direction of its length and while the gut is wet, successively supporting free between separated points a second unit of length of the string which is a multiple of the first mentioned unit of length to distribute the twists substantially uniformly along the entire string, drying the string to bond it permanently into a substantially uniformly twisted string, and severing said second lengths from the string adjacent the points of support to form a plurality of sutures.

4. In a method of making sutures from short pieces of animal gut, the improvement which includes successively joining end-to-end a series of flat ribbons of animal gut, progressively and continuously twisting the joined continuous ribbon into a string having varying numbers of twists in a unit of length while moving the gut in the direction of its length and while the gut is wet, supporting free and under tension between separated points a second unit of length of the string longer than the first unit of length to distribute the twists substantially uniformly along the second unit of length, drying the string to bond it permanently into a substantially uniformly twisted string, and severing said second length from the string adjacent the points of support to form a suture.

5. In a method of making sutures from short pieces of animal gut, the improvement which includes successively joining end-to-end a series of flat ribbons of animal gut, progressively and continuously twisting the joined continuous ribbon into a string having varying numbers of twists in a unit of length while moving the gut in the direction of its length and while the gut is wet, continuously and progressively leading the string through a drying atmosphere, and while the string is in such atmosphere supporting a second length of the string free between supporting points separated from each other by a distance greater than said length to distribute the twists uniformly along the string.

6. In a method of making sutures from short pieces of animal gut, the improvement which includes successively joining end-to-end a series of flat ribbons of animal gut, progressively and continuously twisting the joined continuous ribbon into a string having varying numbers of twists in a unit of length while moving the gut in the direction of its length and while the gut in wet, continuously and progressively leading the string through a drying atmosphere, and while the string is in such atmosphere supporting a second length of the string free and under tension between supporting points separated from each other by a distance greater than said length to distribute the twists uniformly along the string.

7. A twisting device comprising in combination means for feeding a strand to be twisted into a string axially stationary rotatable means for receiving a package of the twisted string, means revolvable about the rotatable means for guiding the string on the package, a stationary track determined by a plane inclined to the axis of the package for moving the guiding means axially along the package as it revolves about the package and means for positively moving the guiding means around the track to rotate the package and twist the string as it is laid on the package.

8. A twisting device comprising in combination means for feeding a strand into a string to be twisted, axially stationary rotatable means for receiving a package of the twisted string means revolvable about the rotatable means for guiding the string on the package, a stationary track determined by a plane inclined to the axis of the package for moving the guiding means axially along the package as it revolves about the package means for positively moving the guiding means around the track to rotate the package and twist the string as it is laid on the package, and means for retarding rotation of the rotatable means.

9. A twisting device comprising in combination means for feeding a ribbon to be twisted into a round string, axially stationary rotatable means for receiving a package of the twisted string, a twisting element revolvable about the rotatable means for twisting the string and laying it on the package, and means providing a rotating magnetic field surrounding the package for revolving the twisting element about the axis of the package.

10. A twisting device comprising in combination means for feeding a ribbon to be twisted into a round string, axially stationary rotatable means for receiving a package of the twisted string, a twisting element revolvable about the rotatable means for twisting the string and laying it on the package, a track surrounding the package and supporting a twisting element, a magnetic support for the twisting element on the track, and means providing a rotating magnetic field for moving the magnetic support along the track.

11. In a method of rendering more nearly uniform irregularly twisted strings of animal gut the improvement which includes supporting free between separated points a length of irregularly twisted wet string of animal gut allowing the irregularities to be distributed along the string under the inherent action of the twisted string, and drying the distributed string.

12. In a method of rendering more nearly uniform irregularly twisted strings of animal gut the improvement which includes supporting free between separated points under tension a length of irregularly twisted wet string of animal gut allowing the irregularities to be distributed along the string under the inherent action of the twisted string, and drying the distributed string.

13. In a method of rendering more nearly uniform irregularly twisted strings of animal gut the improvement which includes continuously and progressively leading a wet irregularly twisted string of animal gut through a drying atmosphere, and while the string is in such atmosphere supporting a length of the string free and under tension between supporting points separated from each other to distribute the irregularities uniformly along the string.

References Cited

UNITED STATES PATENTS

| 1,560,575 | 11/1925 | Hohmann | 57—35 |
| 1,574,877 | 3/1926 | Ferrand | 57—70 |
| 1,825,061 | 9/1931 | Hargrove | 57—70 |
| 2,480,974 | 9/1949 | Seymour et al. | 57—35 |
| 3,247,660 | 4/1966 | Reeder et al. | 57—35 |

FOREIGN PATENTS

| 641,708 | 5/1922 | Canada. |
| 530,700 | 10/1921 | France. |

WILLIAM S. BURDEN, *Primary Examiner.*